US012279710B2

(12) United States Patent
Klug et al.

(10) Patent No.: US 12,279,710 B2
(45) Date of Patent: Apr. 22, 2025

(54) RECONFIGURABLE ABSORPTION MAT

(71) Applicant: DORAI HOME, INC., West Valley City, UT (US)

(72) Inventors: Jason Charles Klug, Salt Lake City, UT (US); Aaron Basil Nelson, Salt Lake City, UT (US)

(73) Assignee: Dorai Home, Inc.

( * ) Notice: Subject to any disclaimer, the term of this patent is extended or adjusted under 35 U.S.C. 154(b) by 530 days.

(21) Appl. No.: 17/371,451

(22) Filed: Jul. 9, 2021

(65) Prior Publication Data

US 2021/0330110 A1 Oct. 28, 2021

(51) Int. Cl.
*A47G 27/02* (2006.01)
*B01J 20/14* (2006.01)
*B32B 3/06* (2006.01)
*B32B 3/26* (2006.01)
*B32B 9/00* (2006.01)

(52) U.S. Cl.
CPC ..... *A47G 27/0293* (2013.01); *A47G 27/0225* (2013.01); *B01J 20/14* (2013.01); *B32B 3/06* (2013.01); *B32B 3/266* (2013.01); *B32B 9/005* (2013.01); *B32B 2307/728* (2013.01); *B32B 2471/04* (2013.01)

(58) Field of Classification Search
CPC . A47G 27/0293; A47G 27/0225; B01J 20/14; B32B 9/00; B32B 3/00; B32B 13/00; B32B 19/00
See application file for complete search history.

(56) References Cited

U.S. PATENT DOCUMENTS

| 4,577,448 | A | 3/1986 | Howorth |
| 5,325,575 | A | 7/1994 | Ichikawa |
| 2003/0136070 | A1 | 7/2003 | Ku |
| 2004/0261208 | A1* | 12/2004 | McKay ................ B32B 27/304 |
| | | | 15/215 |
| 2007/0059542 | A1* | 3/2007 | Olsta ....................... B09C 1/002 |
| | | | 427/430.1 |
| 2008/0276557 | A1 | 11/2008 | Rapaz |

(Continued)

FOREIGN PATENT DOCUMENTS

| JP | 3155896 U | * 12/2009 |
| JP | 2010184108 A | * 8/2010 |

(Continued)

*Primary Examiner* — Jennifer A Steele
(74) *Attorney, Agent, or Firm* — Headland Law & Strategy; Matthew J. Smyth

(57) ABSTRACT

Reconfigurable rapid drying absorption mats. Such reconfigurable absorption mats include multiple connectable, disconnectable, and reconfigurable diatomaceous earth absorption substrates that are both sustainable and designed to instantly remove water from the surface thereof. Unlike traditional synthetic and cotton textile mats that absorb moisture and generate bacteria, according to the rapid drying absorption mats disclosed herein the component diatomaceous earth substrates do not produce mold. Such diatomaceous earth absorption mat components can each include connectable and disconnectable rubberized bottom polymer pads or webbing to prevent slipping and enable for drying of each individual diatomaceous earth substrate from multiple surfaces and sides thereof.

6 Claims, 6 Drawing Sheets

(56) References Cited

U.S. PATENT DOCUMENTS

| | | | | |
|---|---|---|---|---|
| 2014/0127449 A1* | 5/2014 | Wang | ............... | A47L 23/266 |
| | | | | 428/99 |
| 2015/0247293 A1* | 9/2015 | Allingham | ............ | D04H 1/54 |
| | | | | 428/17 |
| 2018/0283014 A1 | 10/2018 | Hodgkins et al. | | |

FOREIGN PATENT DOCUMENTS

| | | | | |
|---|---|---|---|---|
| JP | 3201820 U | * | 1/2016 | |
| WO | WO-2017160300 A1 | * | 9/2017 | ............ A43B 1/00 |

* cited by examiner

RECONFIGURABLE ABSORPTION MAT

BACKGROUND

Use of an absorption mat such as a bathroom mat in bath and shower facilities at a private place or a public place is well known in the art. Various sizes and shapes of bathroom mats are offered for sale by well-known retail stores. Generally, conventional mats are made in a size and shape that is fixed upon the manufacture thereof. Thus, the person who purchases the bathroom mat is unable to reconfigure the conventional mat as desired for a particular bathroom layout or preference after the bathroom mat is purchased, for example.

To illustrate, referring to FIG. 1 an example of two conventional bathroom mats 10 and 20 and typical bathroom 5 layout is illustrated. As shown, the bathroom 5 includes a bathtub 6, a shower 7, a sink 8, and a toilet 9. Four conventional absorption mats 10 and 20 are generally made of a cotton material. The conventional absorption mats 10 and 20 can vary in size and shape, but the size and shape of each of the mats 10 and 20 are fixed upon purchase. The purchaser of the bathroom absorption mats 10 and 20 for the bathroom 5 can consider and purchase different sizes and shapes of the conventional absorption mats 10 and 20 as shown. However, the size and shape of the conventional absorption mats 10 and 20 are fixed upon purchase. Should the purchaser wish to resize, reshape, expand in size, retract in size, expand in width or length, retract in width or length, or relocate resulting in an undesired size or shape, etc. of the bathmat 10 or 20, the purchaser will be required to purchase a new differently sized or shaped bathmat.

Moreover, traditional textile cotton bathroom mats, for example, are generally prone to becoming saturated and remaining wet for long durations of time especially under increased traffic and multiple daily use. The extended use of such traditional bathroom mats may cause a growth of fungus and bacteria thereon, which may produce an unpleasant odor or appearance. Additionally, the use of such traditional bathroom mats may cause spreading of germs during an extended use thereof. And, when used in a facility where multiple baths or showers are taken per day the concerns regarding the likelihood that a bathroom mat remains saturated causing such sanitary problems and lack of dry comfort during use is of increased concern.

Accordingly, there exists a need for an improved absorption mat in bathing facilities, such as adjacent to bathtubs, sinks, toilets, and shower stalls, which avoids hygiene related problems that may occur due to an extended use of the often repeatably saturated bathmat. There also exists a need for an entirely new type of reconfigurable bathmat that dries rapidly while providing improved comfort and slip resistance. Such environments and concerns are illustrative of many applications and concerns discussed hereinafter.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments of the invention relate to reconfigurable absorption mats. The reconfigurable absorption mats can include a first connectable absorption mat component. The first connectable absorption mat component can include a first rigid absorbent substrate including diatomaceous earth. The first connectable absorption mat component can further include a first connectable polymer webbing or platform for coupling to and/or supporting the first rigid absorbent substrate. The reconfigurable absorption mats can further include a second connectable absorption mat component. The second connectable absorption mat component can include a second rigid absorbent substrate including diatomaceous earth. The second connectable absorption mat component can include a second connectable polymer webbing or platform coupled to and/or supporting the first rigid absorbent substrate. The reconfigurable absorption mat can include one or plurality of connectors for connecting the first connectable absorption mat component to the second connectable abruption mat component.

The first connectable absorption mat component can be substantially flat and include a first substantially straight side of the first connectable absorption mat component. The second connectable absorption mat component can also be substantially flat and include a first substantially straight side of the second connectable absorption mat component. The connector connecting the first substantially straight side of the first connectable absorption mat component to the first substantially straight side of the second connectable absorption mat component.

The first connectable absorption mat component can include a second substantially straight side of the first connectable absorption mat component. The second connectable absorption mat component can include a second substantially straight side of the second connectable absorption mat component. The connector configured to disconnect to the first substantially straight side of the first connectable absorption mat component and disconnect from the first substantially straight side of the second connectable absorption mat component and connect the first substantially straight side of the first connectable absorption mat component to the second substantially straight side of the second connectable absorption mat component.

The first connectable polymer webbing can include an interlocking feature. The second connectable polymer webbing can include an interlocking feature. The connector can include two interlocking features, a first interlocking feature of the connector configured to connect the connector to the interlocking feature of the first connectable polymer webbing of the first connectable absorption mat component, and a second interlocking feature of the connector configured to connect the connector to the interlocking feature of the second connectable polymer webbing of the second connectable absorption mat component. Thus, the connector can selectively connect, disconnect, and reconnect sides of the webbings in different configurations and extensions.

The first connectable absorption mat component can be substantially flat and square, rectangular, or other shape with a top, a bottom, and four, more, or less sides. The second connectable absorption mat component can be substantially flat and square, rectangular, or other shape with a top, a bottom, and four, more, or less sides. The connector can be configured to connect a first side of the first connectable absorption mat component to a first side of the second connectable absorption mat component such that the first connectable absorption mat component extends adjacent to the second connectable absorption mat component in a first direction. The connector can be configured to disconnect the first side of the first connectable absorption mat component from the first side of the second connectable absorption mat component. The connector can be configured to connect the first side of the first connectable absorption mat component to a second side of the second connectable absorption mat component such that the first connectable absorption mat component extends adjacent to the second connectable absorption mat component in a second direction. The first direction can be perpendicular to the second direction. The first direction can be parallel to the second direction, and the first side of the second connectable absorption mat component is on an opposite side of the second connectable absorption mat component from the second side of the second connectable absorption mat component.

Each connectable polymer webbing can include a polymer interlocking feature extending from a top surface of each connectable polymer webbing. Each rigid absorbent substrate can include a rigid interlocking feature extending into the bottom of the rigid absorbent substrate and configured to interlock with the polymer interlocking feature of a polymer webbing connected to the respective rigid absorbent substrate. The interlocking features can be a protrusion mating with a void or other corresponding locating feature.

A connection portion of each polymer webbing can have a reduced thickness to accommodate connection to the connector. A thickness of the connector can correspond with the reduced thickness of the connection portion of each polymer webbing such that when connected an upper surface is substantially flush or flat.

A reconfigurable absorption mat can include a plurality of substantially rectangular and/or substantially square connectable absorption mat components. According to some embodiments, each substantially rectangular and/or substantially square connectable absorption mat component can include a substantially rectangular or substantially square absorbent substrate including diatomaceous earth and a connectable polymer webbing configured to secure to an underside or around sides of the first rigid absorbent substrate. A plurality of connectors can be configured to connect and disconnect different sides of a plurality of substantially rectangular and/or substantially square connectable absorption mat components to reconfigure the shape of the reconfigurable absorption mat.

The shape of the reconfigurable absorption mat can be reconfigured to change a width, length, and/or shape of the reconfigurable absorption mat. A method of reconfiguring the reconfigurable absorption mat can include configuring the reconfigurable absorption mat in a first shape, disconnecting one or more of the plurality of substantially rectangular and/or substantially square connectable absorption mat components from the other plurality of substantially rectangular and/or substantially square connectable absorption mat components, and reconfiguring the absorption mat in a second shape, the second shape being different from the first shape.

A method of configuring a reconfigurable absorption mat can include configuring the reconfigurable absorption mat in a first shape and connecting one or more additional substantially rectangular and/or substantially square connectable absorption mat components to the plurality of substantially rectangular and/or substantially square connectable absorption mat components to reconfigure the reconfigurable absorption mat in a second shape, the second shape being different from the first shape. For example, a different shape can have a different width, length or peripheral shape.

Methods of manufacturing a reconfigurable absorption mat can include forming a plurality of hard absorbent layers, each hard absorbent layer including diatomaceous earth, molding a plurality of connectable polymer webbings, locating, providing a locating feature and/or securing each polymer webbing to an underside of one of the plurality of hard absorbent layers to form a plurality connectable absorption mat components, and providing a plurality of connectors for connecting the polymer webbing s together in different configurations.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

Embodiments of the invention relate to a rapid drying absorption mat that also provides improved comfort, slip resistance, and advantageous manufacturing processes, designs, and assemblies of components, materials, and manufactures.

DETAILED DESCRIPTION

Figure 1:
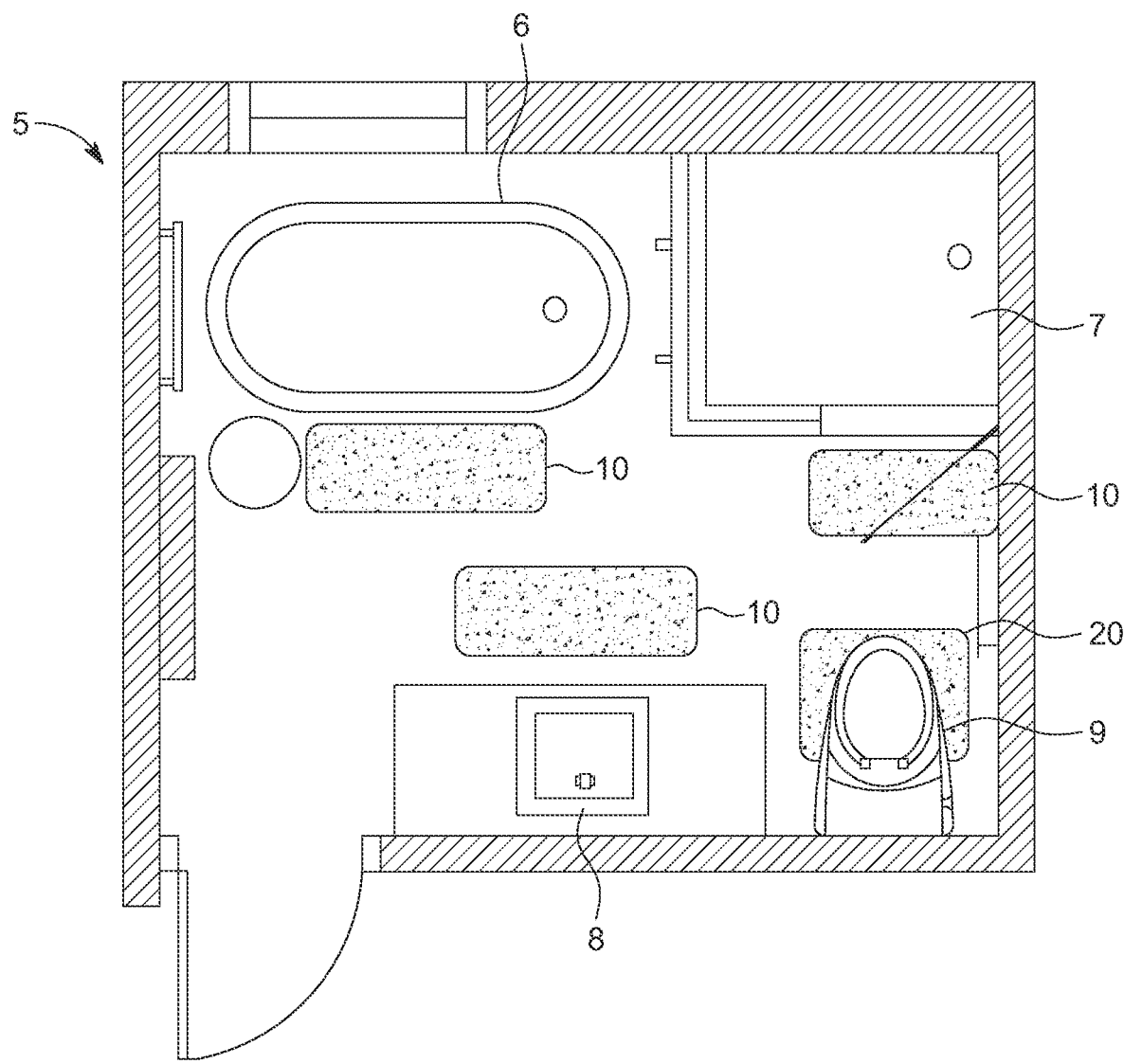
FIG. 1 illustrates a typical layout of conventional bathmats in a bathroom.

Embodiments of the invention relate to reconfigurable and scalable rapid drying absorption mats. Such innovations include the disclosed designs, components, and assemblies of components, materials, and manufacturing techniques. Such reconfigurable absorption mats include multiple connectable, disconnectable, and reconfigurable diatomaceous earth absorption substrates that are both sustainable and designed to instantly remove water from the surface thereof. Unlike traditional synthetic and cotton textile mats that absorb moisture and generate bacteria, according to the rapid drying absorption mats disclosed herein the component diatomaceous earth substrates do not produce mold. Like a natural stone, the diatomaceous earth substrates are made from ceramic-like material that holds firm under feet. Such diatomaceous earth absorption mat components can each include a rubberized bottom pad or webbing to prevent slipping and allow for 360-degree drying of each individual diatomaceous earth substrate.

If the diatomaceous substrate layers get stained, they can be cleaned in two ways. For light stains or scuffs a sanding tool can be used to gently rub off any marks. For more extreme stains, small amounts of bleach or hydrogen peroxide can be used. When moisture encounters the surface of the diatomaceous earth substrate, the material attracts and binds bacteria and parasites, causing them to dry out and die. Water rapidly evaporates from the diatomaceous earth absorption mat through millions of pores therein.

Several of the embodiments disclosed hereinafter combine multiple reconfigurable absorptive mat components including hard diatomaceous earth absorptive substrates also referred to as "bath stones" along with improved anti-slip, evaporation, and saturation isolation using the disclosed absorption bathmat designs. Each absorption mat component can further allow the addition of a slip resistance bottom layer or webbing with interlocking features for positioning and securing adjacent sides of two, three, four, or more absorption mat components together to complete the reconfigurable mat in a desired shape and size. These arrays of interconnected diatomaceous earth mat components utilize the firmness, wicking, and absorbent nature of the diatomaceous earth substrate of each absorption mat component in a variable size and shape connectable, disconnectable, and reconnectable in different reconfigurable designs as discussed herein.

Embodiments disclosed herein are directed to a composite and reconfigurable absorption mat and/or intermediate manufactures and methods related thereto. The reconfigurable absorption mat can be in the form of multiple assembled components in the form of a collective planar combined diatomaceous substrate of variable size and shape. The nature and rigidity of the composite parts, elements, or layers of each interconnected absorption mat component may be manufactured from distinct materials and individually assembled. Each assembled reconfigurable absorption mat component can be shipped, packaged, and sold individually, or in a set, for example. Thus, where a purchaser desires to reconfigure an absorption mat with a single bathmat component, the purchaser is now able to purchase a single bathmat component and assemble the additional diatomaceous earth substrate with the existing bathmat assembly as a desired extension and/or reconfiguration thereof.

Assembly of one or more individual components of the absorption mat can include interconnectable mechanical features for assembling and fastening the components including the diatomaceous earth substrates together. The shape of the bathmat components may interrelate in that an outer periphery of a bathmat component may correspond or fit with a non-uniform thickness feature. In some embodiments, a non-planar layer corresponds or fits with the outer periphery or shape of another layer such that when assembled the composite assembly can provide an aesthetically pleasing substantial flat and functionally stable mat. Then, when assembled, the non-uniform assembly of one or more layers or components of an absorption mat can create a substantially planar mat. According to other embodiments the absorption mat can also include adhesion or other chemical processes of manufacture or assembly for affixing the layers or components of the composite absorption mat together. For example, the non-slip layer may be coupled, bound, or adhered to connectors for interconnecting bathmat components and a series of interconnected rubber underlayers can be disposed on an underside of the absorption mat when assembled and used. The rubber under-layer webbing can have upwardly extending locating protrusions for interlocking with corresponding interlocking voids molded or manufactured in a bottom surface of the diatomaceous earth substrates to further secure and hold the rubber bottom support layer to the diatomaceous earth panels.

In some embodiments, the diatomaceous earth substrate can have surface features (e.g. see 112 in FIG. 4) such as grooves or irregular surfaces which may be manufactured or cut, such as by using a ball mill, into the diatomaceous earth layer to increase the evaporative surface area of the mat and for ornamental or aesthetic purposes. Such surface features may also decrease the likelihood of slipping on the top layer of the absorption mat by introducing non-planar surfaces thereto thereby increasing non-regular surfaces and increasing the diatomaceous stone friction surface area.

As discussed herein, the layers or components of the absorption mat can include mechanical features for assembling and securing the layers and sections thereof together. Mechanically attaching, assembling, or manufactured features can include straps, folds, pockets, clasps, straps, and other features for mechanically affixing components of the absorption mat together and/or for interconnecting adjacent panels, mats, or webbing.

According to some embodiments, the absorption mat can include two or more individual diatomaceous earth components with different relative evaporative and/or non-slip attributes. Different layers or components of the absorption mat may include different materials. For example, a first layer or component may include a polymer component. A second layer or component may include a diatomaceous earth wicking and evaporative material. The diatomaceous earth layer can be pressed and/or include a binder such as a recycled paper component to hold the diatomaceous earth in a layer as opposed to a traditional powder as generally found.

Diatomaceous earth—also known as D.E., diatomite, or kieselgur/kieselguhr—is a naturally occurring, soft, siliceous sedimentary rock that is traditionally easily crumbled into a fine white to off-white powder. It has a particle size ranging from less than 3 μm to more than 1 mm, but typically 10 to 200 μm. Depending on the granularity, this powder can have an abrasive feel, similar to pumice powder, and has a low density as a result of its high porosity. The typical chemical composition of oven-dried diatomaceous earth is 80-90% silica, with 2-4% alumina (attributed mostly to clay minerals) and 0.5-2% iron oxide.

Diatomaceous earth consists of fossilized remains of diatoms, a type of hard-shelled protist (chrysophytes). As disclosed herein the layer or component of diatomaceous earth of the mat is used as an absorbent and rapid evaporator for liquids. The thermal properties of diatomaceous earth also enable it to be used as the barrier material according to several embodiments disclosed herein. In some embodiments, the diatomaceous earth layer can include other components such as wood fiber, paper pasting agents, and other known fillers and binders to extrude, form, and cure a solid diatomaceous earth layer having the absorption properties disclosed herein.

Figure 2:
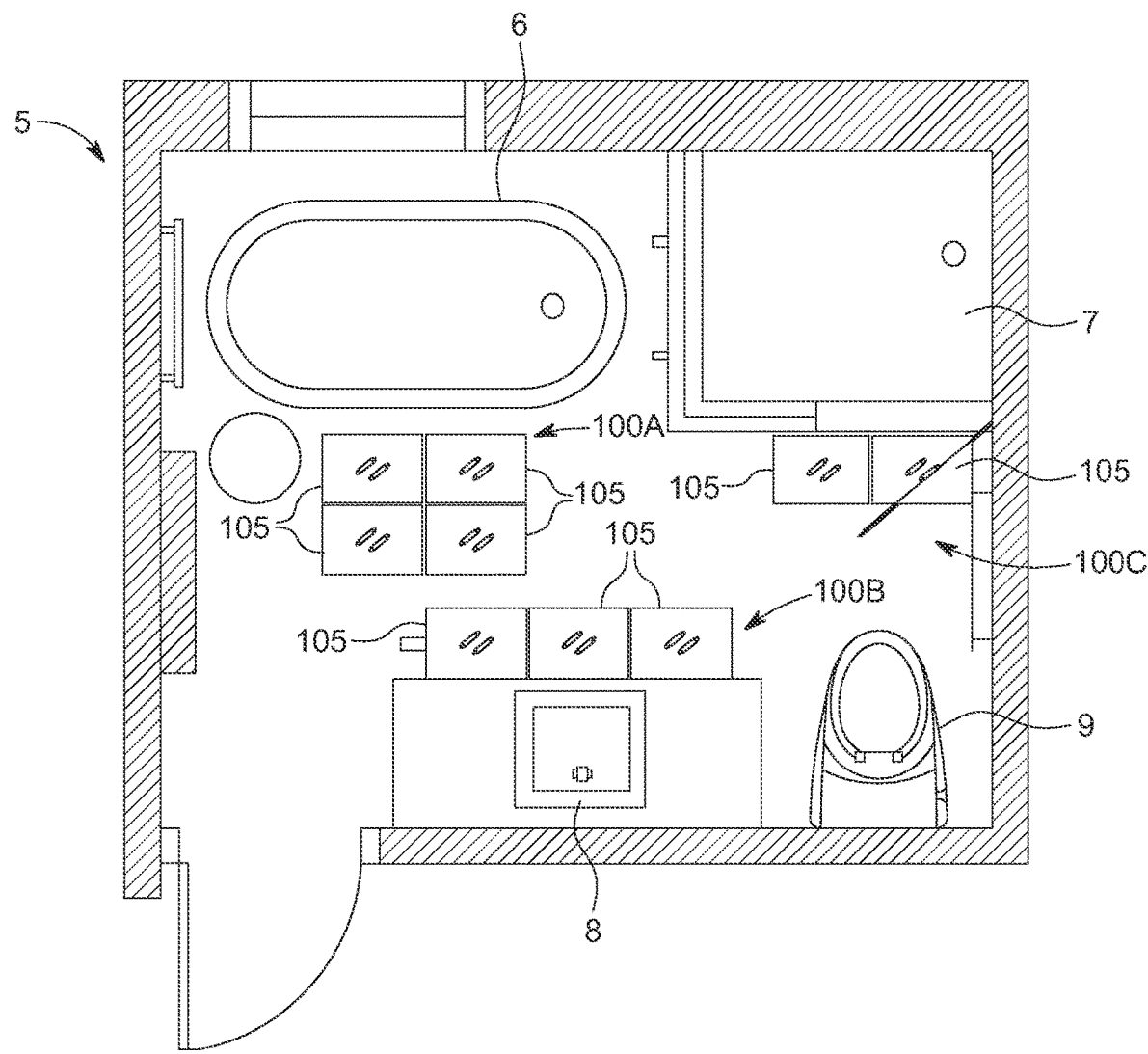
FIG. 2 illustrates an arrangement and layout of reconfigurable absorption mats to illustrate the invention.

Referring to FIG. 2, a plurality of rapid drying reconfigurable absorption mats 100A, 100B, and 100C are shown according to embodiments of the invention. The absorption mats 100 include a plurality of reconfigurable absorption mat components 105. According to this layout of reconfigurable absorption mats 100, a first reconfigurable absorption mat 100A has four assembled and connected absorption mat components 105 placed adjacent to a bathtub 6 in a rectangular configuration of interconnected adjacent absorption mat components 105. A second reconfigurable absorption mat 100B has three assembled absorption mat components 105 assembled and connected to adjacent absorption mat components 105 in a line, or single directional array, of absorption mat components 105. A third reconfigurable absorption mat 100C has two assembled and connected absorption mat components 105 disposed adjacent to one another and proximate to an entrance of the shower.

Figure 3:
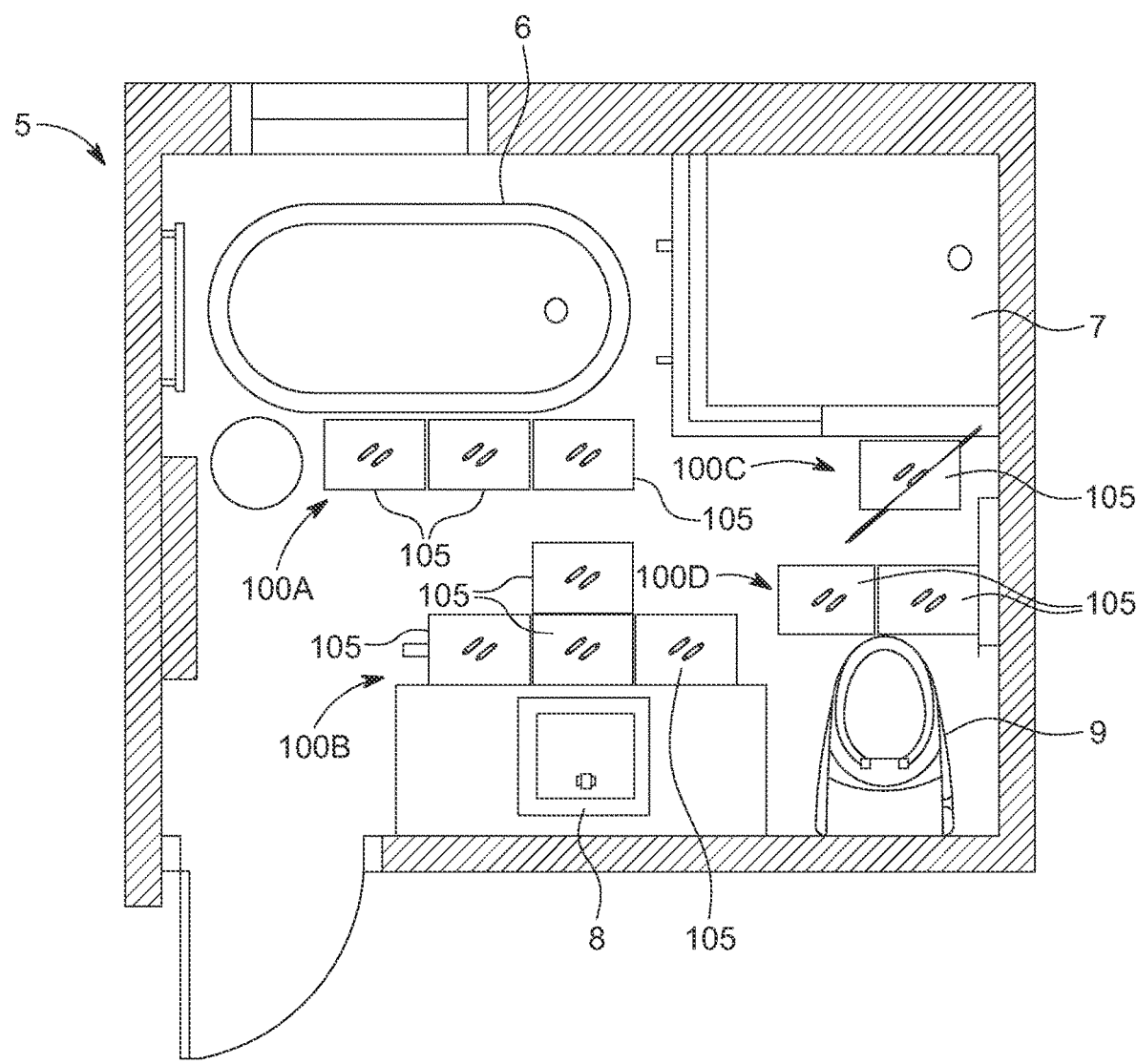
FIG. 3 illustrates a reconfigured layout of reconfigurable absorption mats to illustrate the invention.

Referring to FIG. 3, the plurality of rapid drying reconfigurable absorption mats 100A-100C have been reconfigured and a new rapid drying reconfigurable absorption mat 100D has been assembled adjacent to the toilet 9. As shown, rapid drying reconfigurable absorption mat 100A has been reconfigured into a row, or one-dimensional array, of three assembled absorption mat components 105 adjacent to the bath tub 6. Rapid drying reconfigurable absorption mat 100B has been reconfigured into a T-shaped configuration with an additional absorption mat component 105 assembled thereto. Rapid drying reconfigurable absorption mat 100C has been reconfigured to include only a single absorption mat component 105. And the new rapid drying reconfigurable absorption mat 100D includes two adjacent and connected absorption mat components 105 disposed in front of the toilet 9.

Figure 4:
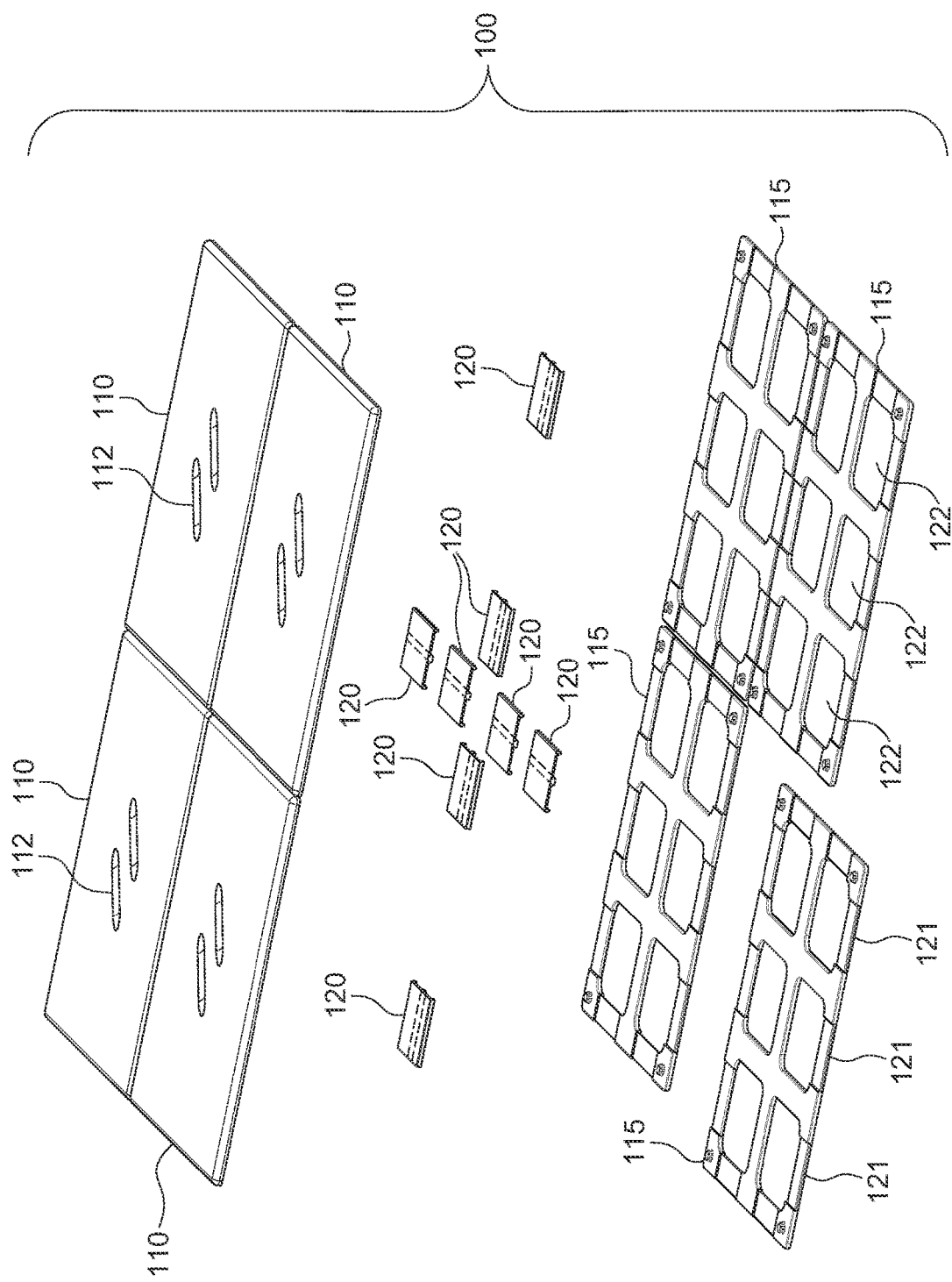
FIG. 4 illustrates an exploded view of the components and subcomponents of the reconfigurable bathmat.

Referring to FIG. 4 an exploded view of the components of an example of a reconfigurable absorption mat 100 are illustrated. The reconfigurable absorption mat 100 includes four absorption mat components 105 (see FIGS. 2 and 3) each comprising a diatomaceous earth substrate 10 and a polymer webbing 115 for supporting, locating with and coupling to corresponding rigid and absorbent diatomaceous substrate 110. The connectable polymer webbings 115 locating and being coupled to the corresponding diatomaceous earth substrate 110 by corresponding locating features in the form of a protrusion and matching void or keying features. A plurality of connectors 120 are shown for connecting the connectable absorption mat components together by connecting to adjacent webbings 115.

Figure 5:
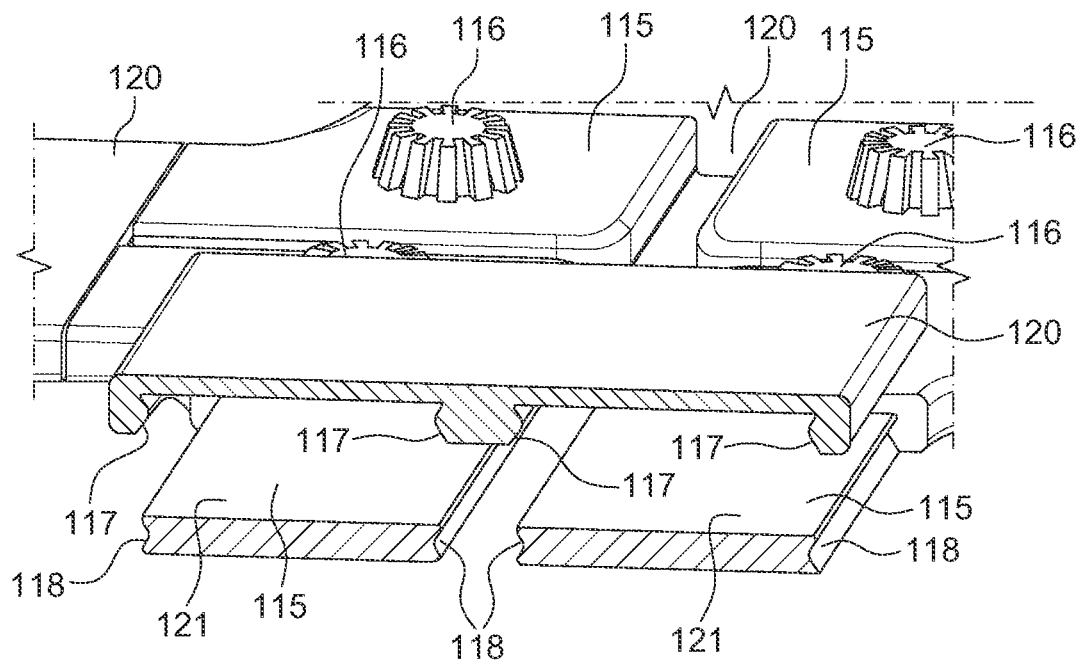
FIG. 5 illustrates an unconnected connector for connecting adjacent bathmats.
Figure 6:
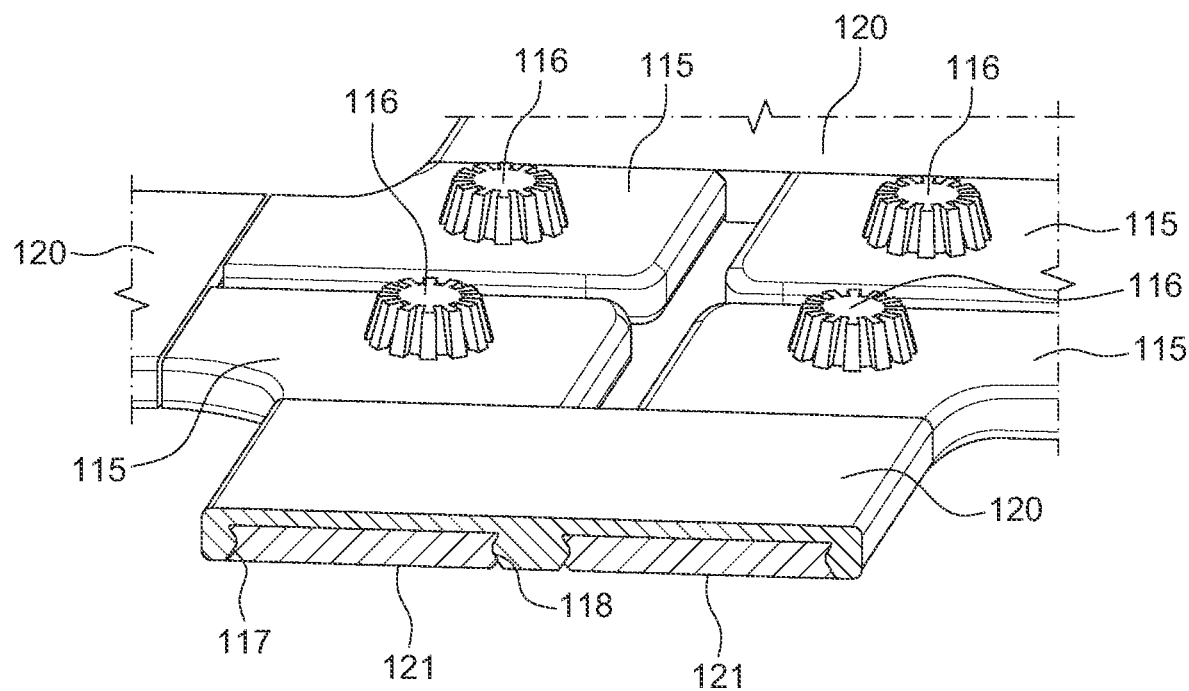
FIG. 6 illustrates a connected connector connecting webbings of adjacent absorption mat components.

Referring to FIGS. 5 and 6, the connectors 120 are configured to connect a first connectable polymer webbing 120 includes interlocking features 118 corresponding to interlocking features 117 of each connector. Thus, as shown in FIG. 6, the connectors 120 fit over and connect adjacent webbings 120 together. As shown in FIGS. 4-6, the bottom polymer webbings 115 can have a portion of reduced thickness 121 at the locations of connection of the webbings 115 with the connectors 120. This portion of reduced thickness can correspond with the thickness of the connectors 120 to make a substantially flat planar top surface with the combined thickness of the connector 120 and portion of reduced thickness 121 of the webbing 115 as shown in FIG. 6.

As shown in FIGS. 5 and 6, each webbing 115 can have one or more locating protrusions 116. These locating protrusions 116 can correspond in shape to one or more locating voids 119 as shown in the cross-sectional view of FIG. 7. The assembly of the adjacent connected diatomaceous earth components 105 by connection of adjacent webbings as shown in FIG. 6 align and locate the locating protrusions 116 with the locating voids 119 as shown in FIG. 7 such that the diatomaceous earth substrates 110 do not move relative to the corresponding underlayer provided by the corresponding interlocked webbings 115.

Figure 7:
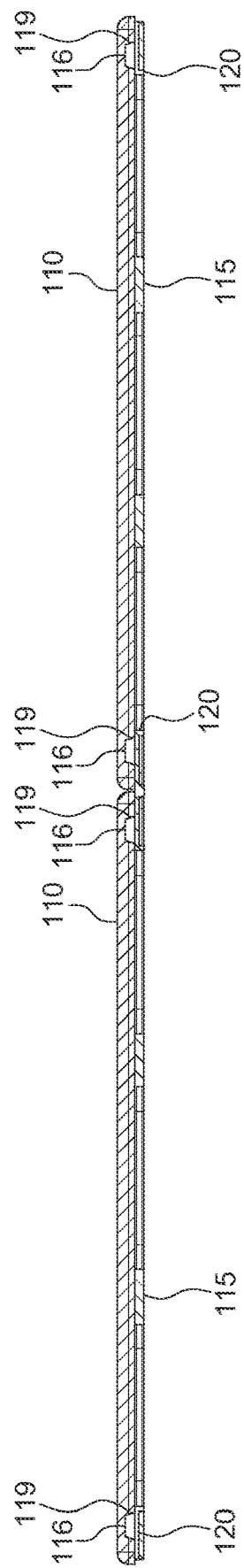
FIG. 7 is a cross-sectional view of the reconfigurable bathmat showing the interconnection of locating features of the webbing and diatomaceous earth substrates of adjacent interconnected bathmat components.

Referring to FIGS. 4 and 7, the underlying webbings 115 can have cutouts 122 which allow air to circulate underneath the corresponding diatomaceous earth substrate 100. This air pocket provided by each cutout 122 allows for evaporation of air from the under side (i.e. the bottom side) of the individual diatomaceous earth substrates 110. Moreover, as the sides of the diatomaceous earth substrates 110 are also exposed to air, evaporation of moisture from the diatomaceous earth substrates 110 can be accomplished from the top, bottom, and side surfaces of the diatomaceous earth substrates 110. According to other embodiments (not shown) a webbing can extend over the sides of diatomaceous earth substrates 110, however, evaporation from such surfaces may be limited. Thus other locating, means for affixing, or means for locating the diatomaceous earth substrates 110 to the webbings 115 or other non-slip surfaces may be accomplished according to other embodiments.

Thus, the embodiments disclosed herein provided rapid drying of an absorption mat, or other article, that is subjected to repeated saturation or wet environments while providing for a comfortable, ergonomic and safe bathroom mat. Shapes of the individual absorption mat components can be other than rectangular or square, which are non-limiting examples of shapes of individual absorption mat components for illustration purposes only. Other shapes can be any geometric shape, curved, or irregular interconnectable shapes of individual absorption mat components. And the individual absorption mat components need not have the same shape. Thus, an irregular shape, such as to extend around a toilet can be interconnectable to a square or other shape of mat component(s).

It is understood that when an element is referred hereinabove as being "on" another element, it can be directly on the other element or intervening elements may be present there between. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Herein is presented a newborn anti-scratch and chew mitt. The disclosure is illustrated by example in the drawing figures, and throughout the written description. It should be understood that numerous variations are possible, while adhering to the inventive concept. Such variations are contemplated as being a part of the present disclosure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A reconfigurable absorption mat, comprising:
   a first polymer webbing and
   a second polymer webbing, each of the first polymer webbing and the second polymer webbing having a planar bottom surface and a top surface; being characterized by a length, a width and a thickness between the planar bottom surface and the top surface; and having a plurality of protrusions extending from the top surface, a first reduced-thickness portion along the length having a first interlocking feature and a second reduced-thickness portion along the width having a second interlocking feature;
   a first rigid absorbent substrate and a second rigid absorbent substrate, each of the first rigid absorbent substrate and the second rigid absorbent substrate being characterized by the length and the width; and comprising diatomaceous earth and a plurality of keying voids that correspond to and receive the plurality of protrusions when one of the first rigid absorbent substrate or the second rigid absorbent substrate is disposed on top of one of the first polymer webbing or the second polymer webbing; and
   a connector having a mating feature that is configured to removably couple the first polymer webbing to the second polymer webbing by being disposed in the first reduced-thickness portion and coupling to both the first interlocking feature of the first polymer webbing and the first interlocking feature of the second polymer webbing, or by being disposed in the second reduced-thickness portion and coupling to both the second interlocking feature of the first polymer webbing and the second interlocking feature of the second polymer webbing; wherein a thickness of the connector and the first reduced-thickness portion or the thickness of the connector and the second reduced-thickness portion are such that the connector does not extend above the first reduced-thickness portion or above the second reduced-thickness portion, beyond the top surface.

2. The reconfigurable absorption mat according to claim 1, wherein the first rigid absorption substrate is substantially flat and rectangular with a top, a bottom, and four sides; and the second rigid absorption substrate is substantially flat and rectangular with a top, a bottom, and four sides.

3. A reconfigurable absorption mat, comprising:
   a first connectable absorption mat component, comprising:
     a first rigid absorbent substrate including diatomaceous earth; and
     a first connectable polymer webbing configured for coupling the first connectable polymer webbing to an underside of the first rigid absorbent substrate;
   a second connectable absorption mat component, comprising:
     a second rigid absorbent substrate including diatomaceous earth; and
     a second connectable polymer webbing configured for coupling the second connectable polymer webbing to an underside of the first rigid absorbent substrate; and
   a connector for connecting the first connectable absorption mat component to the second connectable absorption mat component;
   wherein a connection portion of each polymer webbing has a reduced thickness to accommodate connection to the connector; and
   wherein a thickness of the connector corresponds with the reduced thickness of the connection portion of each polymer webbing.

4. A reconfigurable absorption mat, comprising:
   a plurality of substantially rectangular connectable absorption mat components, each substantially rectangular connectable absorption mat component comprising:
     a substantially rectangular absorbent substrate including diatomaceous earth;
     a connectable polymer webbing configured to removably secure to an underside of the substantially rectangular absorbent substrate; and
     a plurality of connectors configured to connect and disconnect different sides of a plurality of the substantially rectangular connectable absorption mat components to reconfigure the shape of the reconfigurable absorption mat from a first shape to a second shape that is different from the first shape.

5. The reconfigurable absorption mat according to claim 4, wherein the shape of the reconfigurable absorption mat is reconfigured to change a width, length, or shape of the reconfigurable absorption mat.

6. The reconfigurable absorption mat of claim 1, wherein the first polymer webbing includes cutouts that allow for circulation of air under the first rigid absorbent substrate when the first rigid absorbent substrate is disposed on the first polymer webbing.

\* \* \* \* \*